United States Patent
Ross et al.

(10) Patent No.: US 11,141,683 B2
(45) Date of Patent: Oct. 12, 2021

(54) GAS-TIGHT LOW GRAVITY SEPARATION DEVICE

(71) Applicant: RECOVER ENERGY SERVICES INC., Calgary (CA)

(72) Inventors: Stan Ross, Cochrane (CA); Matthew Scalley, Calgary (CA)

(73) Assignee: RECOVER ENERGY SERVICES INC., Calgary (CA)

(*) Notice: Subject to any disclaimer, the term of this patent is extended or adjusted under 35 U.S.C. 154(b) by 645 days.

(21) Appl. No.: 15/797,811

(22) Filed: Oct. 30, 2017

(65) Prior Publication Data

US 2018/0117503 A1    May 3, 2018

Related U.S. Application Data

(60) Provisional application No. 62/415,156, filed on Oct. 31, 2016.

(51) Int. Cl.
```
C09K 8/32    (2006.01)
B01D 21/26   (2006.01)
E21B 21/06   (2006.01)
B01D 21/24   (2006.01)
B01D 21/00   (2006.01)
```

(52) U.S. Cl.
CPC ....... *B01D 21/262* (2013.01); *B01D 21/0045* (2013.01); *B01D 21/2455* (2013.01); *B01D 21/2461* (2013.01); *C09K 8/32* (2013.01); *E21B 21/068* (2013.01)

(58) Field of Classification Search
CPC ............................. E21B 21/06; B01D 21/26
See application file for complete search history.

(56) References Cited

U.S. PATENT DOCUMENTS

| | | | | |
|---|---|---|---|---|
| 5,053,082 A | * | 10/1991 | Flanigan | B01D 11/0223 134/25.1 |
| 5,090,498 A | * | 2/1992 | Hamill | B01D 36/04 175/206 |
| 6,585,115 B1 | * | 7/2003 | Reddoch | E21B 41/0057 209/3 |
| 9,518,435 B2 | * | 12/2016 | Fout | C09K 8/24 |

* cited by examiner

*Primary Examiner* — William D Hutton, Jr.
*Assistant Examiner* — Avi T Skaist
(74) *Attorney, Agent, or Firm* — Greenblum & Bernstein, P.L.C.

(57) ABSTRACT

A method and apparatus for removing low micron solids from a mixture of recovered oil based drilling fluid and low micron solids and diluent. A gas tight clarifier device that is designed and constructed for this purpose in a gas-tight manor so to ensure vapour cannot escape the separation process, and foreign oxygen cannot enter the process under normal operating conditions.

25 Claims, 5 Drawing Sheets

GAS-TIGHT LOW GRAVITY SEPARATION DEVICE

CROSS-REFERENCE TO RELATED APPLICATION

The present application claims the benefit under 35 U.S.C. § 119(e) of U.S. provisional application Ser. No. 62/415,156 filed on Oct. 31, 2016, the disclosure of which is hereby expressly incorporated by reference in its entirety.

TECHNICAL FIELD

The field of art to which this invention generally pertains is the processing of drilling waste.

BACKGROUND

During the drilling of a well, for example for gas or oil, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil based drilling fluids are often used to drill oil and gas wells because they have special characteristics that make them a better cooling/carrying fluid than other drilling muds. Additionally, such drilling muds may offer better wellbore stability and/or lubricity for the drill string in modern, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then transported to a secure landfill where they are stored for an indeterminate period of time, typically generations.

The recovered drilling fluids that have been subjected to solids separating devices, such as that of shale shakers or decanter centrifuges still contain residual amounts of small solids, otherwise known as Low Gravity Solids, commonly known as drilled solids or ultra fines by those in the industry.

The accumulation of Low Gravity Solids in an active drilling mud system is of significant concern to drilling well operators because they contribute to increased wear of high volume circulating equipment, they can cause the drill string to become differentially stuck in porous formations leading to expensive drilling downtime, and they contribute to reduced rates of drilling penetration, commonly known by those in the industry as the Rate of Penetration (ROP).

With the evolution of new drilling technologies such as horizontal drilling, shale oil or shale gas fracking, and the increasing cost of drilling fluids, the ability to, and benefits of, enhancing spent drilling fluid to its new or original condition, is increasing.

Accordingly, there is a constant search for new technologies and improvements to existing technologies to increase the efficiency and effectiveness of reclaiming processes.

BRIEF SUMMARY

A method of removing low micron solids from recovered oil based drilling fluid is described including mixing the low micron solids containing drilling fluid with a diluent and, calming the mixture in a gas tight clarification device to produce a recovered liquids phase and separated low micron solids slurry, where the clarification device is sealed so as to prevent escape of vapors from the mixture into the atmosphere containing oxygen and the introduction of atmospheric oxygen into the mixture or the environment of the mixture being clarified, the clarification device includes a gas tight inlet for the mixture, the clarification device includes a gas tight outlet for the recovered liquids phase, and the clarification device includes a gas tight outlet for the separated low micron solids slurry.

Additional embodiments include: the method described above where the clarification device includes a conveyor in fluid flow communication with the gas tight outlet to collect the low micron solids slurry; the method described above where the clarification device includes a hopper shaped bottom inclined at an angle; the method described above where the angle exceeds the angle of repose of the settled low micron solids; the method described above here the gas tight clarification device is sealed so as to provide an internal working pressure up about 750 Torr gauge; the method described above where the method of removing is performed in an inert atmosphere; the method described above where the inert atmosphere comprises carbon dioxide, nitrogen, natural gas, and/or mixtures thereof, and less than 9% oxygen; the method described above where the diluent has a vapour pressure between about 0.1 Torr gauge and about 750 Torr gauge measured at 20° C.; the method described above where the diluent has a closed cup flash point less than or equal to 37° C.; the method described above where the slurry of low micron solids removed from the clarification device has a flash point of less than 37° C.; the method described above where the liquids phase of the mixture has a plastic viscosity of less than or equal to 5 cP; the method described above where the liquids phase of the mixture has a yield point less than or equal to 1 Pa; the method described above 1, where the diluent is hexane; the method described above where the mixture has a vapour pressure equal to or greater than 0.1 Torr gauge and less than 750 Torr gauge when measured at 20° C. and the mixture has a closed cup flash point equal to or less than 37° C.; the method described above where the diluent and the recovered oil based drilling fluid are blended prior to introduction into the gas tight clarification device. The method described above where the diluent and the recovered oil based drilling fluid are blended in a gas tight blending tank prior to being introduced into the gas tight clarification device; the method described above where the oil based drilling fluid containing low gravity solids is recovered by a solids control process, and diluent is added prior to low gravity solids removal in the gas-tight clarification device; the method described above where the solids control process includes a centripetal cuttings drier, an atmospheric oilfield decanter centrifuge, a shale shaker, and/or a hydrocyclone; the method described above where the oil based drilling fluid, low gravity solids and diluent are first introduced into a gas tight decanter centrifuge at a controlled rate and the gas tight decanter centrifuge is operated at a percentage of less than the rated hydraulic loading capacity so as to produce less than 1% by weight low micron solids in the recovered liquids phase, prior to the recovered liquids phase of the gas tight decanter centrifuge being introduced to the clarification device; the method described above where the recovered liquid phase from the clarification device contains low micron solids in a quantity less than 1% (by weight); the method described above, where the recovered liquid phase from the clarification device contains low micron solids in a quantity less than 0.1% (by weight); the method described above where the slurry of low micron solids is removed using a conveyor; the method described above where the diluent and oil based drilling fluid introduced to the clarifying tank contains low micron solids that are less than 5 microns in average size; and the method described above where the diluent and oil based drilling fluid introduced to the clarifying tank contains low micron solids that are greater than 5 microns in average size; the method described above where the liquids phase recovered from the clarifying process is sent to one or more additional gas tight processes including solids drying, wash processing, diluent evaporation, and/or filtration.

An apparatus for removing low micron solids from recovered oil based drilling fluid is also described including gas tight clarification device for calming a mixture of diluent and low micron solids containing drilling fluid to produce a recovered liquids phase and separated low micron solids slurry, where the clarification device is sealed so as to prevent escape of vapors from the mixture into the atmosphere containing oxygen and the introduction of atmospheric oxygen into the mixture or the environment of the mixture being clarified, the clarification device including a gas tight inlet for the mixture, the clarification device including a gas tight outlet for the recovered liquids phase, and the clarification device including a gas tight outlet for the separated low micron solids slurry.

Additional embodiments include: the apparatus described above where the clarification device includes a conveyor in fluid flow communication with the gas tight outlet to collect the low micron solids slurry; the apparatus described above where the clarification device includes a hopper shaped bottom inclined at an angle; the apparatus described above where the angle exceeds the angle of repose of the settled low micron solids; the apparatus described above where the gas tight clarification device is sealed so as to provide an internal working pressure up about 750 Torr gauge; the apparatus described above including a gas tight blending tank for initially mixing the low micron solids containing drilling fluid with the diluent is in fluid flow communication with the gas tight clarification device; the apparatus described above including a solids control device comprising a centripetal cuttings drier, an atmospheric oilfield decanter centrifuge, a shale shaker, and/or a hydrocyclone in fluid flow communication with the gas-tight clarification device; the apparatus described above including a conveyor to remove the separated low micron solids slurry; and the apparatus described above where the clarifying device is in fluid flow communication with one or more gas tight devices including a solids drier, wash processing device, diluent evaporation device, and/or filtration device.

BRIEF DESCRIPTION OF THE DRAWINGS

FIG. 3a is an illustration of a gas tight inclined plate clarifier useful in an embodiment described herein.

FIGS. 3b & 3c are expanded views of sections of the clarifier illustrated in FIG. 3a.

FIGS. 4b & 4c are additional views of the tank illustrated in FIG. 4a.

DETAILED DESCRIPTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

A method to more effectively remove low micron solids from oil based drilling fluid, recovered in an oil based drilling fluid rehabilitation system is described herein.

The following paragraphs define terminology used herein included for ease of understanding.

Mixture is used to reference a fluid comprised of a diluent, oil base drilling fluid and low gravity solids, in any portion of any three within the whole volume of the fluid.

Viscosity is used to describe the thickness of a fluid, and the magnitude of associated frictional effects between fluid molecules. For example, water is not very viscous whereas a milkshake is typically very viscous.

Rheology is used with reference to the study of Newtonian and non-Newtonian fluid behaviour. One facet of a fluids rheology is its "Yield Point," or carrying capacity. A marble dropped in a bottle of water will demonstrate a fluid with a very low yield, because the marble drops without stirring the water. The same marble dropped in a bottle ketchup will not drop through the fluid without a significant amount of stirring or agitation.

Low micron solids are generally known as solids that are less than fifty microns in size. Low micron solids can include high or low gravity solids, which are typically (albeit arbitrarily) separated by a specific gravity (SG) of 3.0 in the drilling industry. For example, high gravity solids are weighting agents like barite or hematite, both of which are heavier than 3.0 SG. Drilled solids and drilling fluid additives, for example, bentone, lime, or lignite are lighter than 3.0 SG.

For purposes of general understanding herein, the Metric system has been used for consistent units of measurement, unless specifically cited as another, except for measurements in "Torr", which is not specific to either the Imperial or Metric systems. Torr measurements are gauge pressure.

The best rates of penetration are achieved when drilling with a light weight drilling fluid. New oil base drilling fluid is very light because it is not yet polluted with a volume of drilled solids and therefore, the best fluid to use to achieve high penetration rates. Thus, for an oil base fluid to be recovered and remarketed as a high quality drilling fluid, the base oil must be free of drilled solids when marketed as base oil.

In light of the significant economic and environmental costs associated with oil base drilling fluid production, use and disposal, and the growing use thereof, improved methods to recover the drilling fluid would be clearly advantageous from both a cost and environmental standpoint.

While applicable to a water base drilling fluid, an example of an onsite, single gravity force separation tank is described in U.S. Pat. No. 6,193,070 wherein a flocculent is added to a water base drilling fluid in need of rehabilitation. The fluid is introduced into one end of the tank and permitted to flow through a series of weirs allowing the solids more time to settle to the bottom of the tank where they are conveyed to a point that a pump can lift the solids laden drilling fluid into a decanter centrifuge for solids removal. The design of the tank works exceptionally well for "floc-water drilling" (water base drilling fluids) because the addition of flocculants cause suspended solids to agglomerate and grow in particle size to larger, heavier solids. However, the use of water base drilling fluids is becoming less common whereas oil base drilling fluid is becoming more common (especially in areas where source rock or shale drilling is occurring). The art described in U.S. Pat. No. 6,193,070 would not work for oil base mud rehabilitation due to the characteristics of the fluid. Most importantly, the use of this tank when volatile or flammable liquids are present would be extremely dangerous due to the open top design of the tank, which allows for operators to observe the process.

While drilling an oil or gas well in the past, it was common place to employ hydro-cyclones, commonly known as mud cleaners to remove small micron solids. Given the inability for this technology to remove a significant portion of the small micron solids, water base muds would become spent over a short period of time and at least a portion of the drilling fluid had to be disposed and replaced with new water based fluids, thereby diluting the accumulation of low micron solids in the mud system. Today, hydro-cyclones have been replaced by horizontal decanter centrifuges because they can exert as much as several thousand gravity forces on the fluid, which is more effective at removing both high and low gravity—low micron—solids.

To demonstrate how difficult it can be to remove low gravity (drilled) solids, Table 1 shows the estimated settling velocity for low micron solids in oil based drilling fluid (with a density of 1200 kilograms per cubic meter ($kg/m^3$)). Table 1 shows the predicted settling velocity at both a single (semi-quiescent) gravity force, and when centrifuged at 2,000 gravity forces. Despite 24 hours being an unreasonable process settling rate, the 24 hour settling rate has been included to emphasize (and put in perspective) the slow rate of settling of the particle sizes of most concern.

TABLE 1

| Low micron solids in a 1200 density OBM | Settling velocity in an un-agitated, static tank (1 gravitational force) | | Settling velocity when centrifuged (2000 gravitational forces) | |
|---|---|---|---|---|
| 1 micron | 0.000005 meters/minute | 0.007 meters per 24 hours | 0.0098 meters/minute | 14.3 meters per 24 hours |
| 10 micron | 0.000491 meters/minute | 0.716 meters per 24 hours | 0.9810 meters/minute | 1430 meters per 24 hours |
| 50 micron | 0.012263 meters/minute | 17.66 meters per 24 hours | 24.525 meters/minute | 35,750 meters per 24 hours |

Given the slow settling rate of a low micron, low gravity drilled solid, traditional methods of onsite solids control offer limited effectiveness.

With the advent of ever increasing recycling initiatives for oil based drilling fluids and drill cuttings, so too is the need for improved drilling fluids rehabilitation to maximize the value of the recovered fluid. As will become clear to the reader, diluent is added to oil based drilling fluid because it alters the rheology of the mixture, thereby allowing the separation of low micron drilled solids to occur quicker. As illustrated in Table 2, even the lowest micron solids can be removed when a single gravitational force is applied to a 5:1 mixture of diluent and drilling fluid and low micron solids respectively. For example, a 1 micron solid without diluent would settle 0.72 centimeter while in static storage over a 24 hour period. A 1 micron solid mixed with a 5:1 ratio of diluent to oil base drilling fluid and low gravity solids would settle more than nine times faster.

bon contaminant. The washing decanter permits additional solid phase-liquid phase interaction moments before the high gravitational forces of the gas tight horizontal decanter separates the solids phase and liquids phase. By applying high gravity forces to a fluid with a lower yield point and

TABLE 2

| Low micron solids in a 1200 density OBM | Settling velocity in an un-agitated, semi-quiescent, clarifying tank (1 gravitational force) | | | Settling velocity when centrifuged (2000 gravitational forces) | | |
|---|---|---|---|---|---|---|
| Solvent to OBM Ratio | 0:1 | 1:5 | 5:1 | 0:1 | 1:5 | 5:1 |
| 1 micron | 0.000005 meters/minute | 0.000008 meters/minute | 0.000046 meters/minute | *Continuous micro-mixing | *Continuous micro-mixing | *Continuous micro-mixing |
| 10 micron | 0.000491 meters/minute | 0.000823 meters/minute | 0.004598 meters/minute | 0.9810 meters/minute | 1.6 meters/minute | 11.1 meters/minute |
| 50 micron | 0.012263 meters/minute | 0.020587 meters/minute | 0.114955 meters/minute | 24.525 meters/minute | 40 meters/minute | 278 meters/minute |

*Continuous micro-mixing caused low micron solids to remain in the recovered centrifuged sample; empirical result.

Given the limited onsite successes of sufficiently removing low gravity solids from the oil base drilling fluid, off site treatment systems have become more common. However, the removal of low micron solids is essential to continued use of the recycled fluids. A proven and reliable method of low micron solids removal is required and essential to the success of bulk drilling fluids reuse and hereby described within.

U.S. Pat. No. 6,550,552 discloses the use of solvent, for example hexane or ethyl acetate, to wash hydrocarbon contaminated drill cuttings. The liquids phase is centrifuged to remove at least a portion of the solids phase. The resulting mixture is then treated in a fine film evaporator at atmospheric pressure, or less than atmospheric pressure which results in the solvent being recovered in the overheads and the boiler bottoms being recovered for reuse as a drilling fluid consisting of oil and clay. Aside from the safety hazards of U.S. Pat. No. 6,550,552 which doesn't mention a gas tight, oxygen deficient atmosphere, the recovered boiler bottoms will have a lessor value due to the fact that it is a mixture of oil and clay. Put simply, the presence of clay suggests at least a portion of drilled solids are present, which is viewed by the industry as the nemesis of high rates of drill penetration. The presence of clay will dictate a lower resale value for the oil.

Commonly owned U.S. Pat. No. 8,820,438 herein incorporated in its entirety by reference, discloses the process of mixing unstabilized drill cuttings and a miscible diluent within a series of gas tight wash tanks. The diluent dissolves the contaminant thereby removing the oil base drilling fluid while reverse contaminating the solids phase with the diluent. The solids phase is then dried and the residual diluent is evaporated, condensed and reused in the wash process. The liquids phase mixture is moved to one or more fluids rehabilitation processes where finally the diluent is evaporated, condensed and reused in the wash process, and the oil phase is reused as a drilling fluid base. While this process is effective at removing hydrocarbons from solids, in general, such processes are less effective at removing solids from the recovered fluids. For example, the presence of clay in the recovered oil will dictate a lower resale value.

Commonly owned U.S. Patent Application Ser. No. 62/303,163 herein incorporated in its entirety by reference, discloses a method of mixing a miscible diluent with unstabilized drill cuttings to allow the diluent to dissolve in the contaminant, thereby altering the rheology of the hydrocarbon contaminant. The washing decanter permits additional solid phase-liquid phase interaction moments before the high gravitational forces of the gas tight horizontal decanter separates the solids phase and liquids phase. By applying high gravity forces to a fluid with a lower yield point and lower plastic viscosity, the process simultaneously removes at least a portion of the lower micron solids. The liquid phase mixture is moved to one or more fluids rehabilitation processes where finally the diluent is evaporated, condensed and reused in the wash process, and the oil phase is reused as a drilling fluid base.

The most significant step forward in a substantial removal of lower micron solids to facilitate recovery of oil base drilling fluid can be found in commonly owned U.S. Patent Application Ser. No. 62/212,754, herein incorporated in its entirety by reference. A method is disclosed where a gas tight horizontal decanter centrifuge is used to remove low micron solids which are otherwise unable to settle in a conventional washing process. While highly effective at removing solids greater than 5 microns in size, the method described in commonly owned U.S. Patent Application Ser. No. 62/212,754 is not likely to remove solids which are less than 5 microns in size. Given the wash process can contribute to further degradation of the solids phase, additional low micron (for example, less than 5 microns in size) solids are likely to become present in the liquid phase. This can pose a particular problem for distillation components because the low micron solid phase can foul heat exchangers thereby reducing the efficiency of the diluent recovery process, or pyrolysis can occur, reducing the value of the recovered diluent.

Pyrolysis is the irreversible thermal decomposition of a substance in absence of oxygen. Larger molecules vibrate more violently as a result of the increased temperature and eventually break down into smaller molecules. In a hydrocarbon compound, the final product from pyrolysis is residual elemental carbon (more commonly known as soot). If pyrolysis were to occur, the recovered oil base drilling fluid would have no value whatsoever and further, would actually be quite expensive to dispose of.

As mentioned above, while commonly owned U.S. Patent Application Ser. No. 62/212,754 has been a most significant step forward in removing low micron solids, it is likely ineffective at removing solids which are less than 5 microns in size. This is due to the mechanical energy invested in the centrifuge, via the spinning bowl and scroll, which inadvertently create an environment of high turbulence. The scroll moves at a different rotational speed to that of the bowl section. High scroll axial velocities are effective for bulk separation of low micron solids and yet a hindrance for preventing the re-suspension of the smallest micron solids.

The gas tight centrifuge creates a turbulent environment with a high degree of micro-mixing when the fluid accelerates up to the machines rotational speed, and in the zones between the scroll and the walls of the bowl. In these zones, fluid eddies churn the suspension thereby potentially re-suspending the solids that have already separated and/or those in the process of settling.

An Inclined plate clarifier, also known as an IPC or Lamella plate clarifier, are often utilized to remove suspended solids in the waste water industry. An inclined plate clarifier allows the polluted fluids to enter the inlet and settle in a semi-quiescent tank. The fluid hydrostatically rises through the plate pack while the solids phase is permitted to settle from the liquids phase and slide down the sloped sides to the bottom of the tank. The liquids phase exits the plate pack and overflows from the inclined plate clarifier. While the inclined plate clarifier only employs a single gravity force to separate the liquids phase and solids phase, the plate pack is estimated to increase the separation efficiency to a level equivalent to three or four times earth's gravity, while employing no moving parts, other than the conveyor to remove the solids, for example a pump or auger, or suction hose. While a plate clarifier is widely used in the waste water industry, it would be an unsatisfactory application for separating low micron solids from an otherwise flammable fluid, given the open top design of inclined plate clarifier tanks.

A live bottom floc tank would allow the mixture of diluent and oil base drilling fluid and low micron solids to enter a first end of the clarifying tank where the mixture can calm in the semi-quiescent environment. The solids phase is permitted to settle out of the liquids phase precipitating along the bottom of the tank which are then conveyed via a pump or auger, or suction hose in a countercurrent flow to that of the fluid flow. While a floc tank is widely used in the oil and gas industry for water base drilling fluid, it would be an unsatisfactory application for separating low micron solids from an otherwise flammable fluid, given the open top design of non-gas tight floc tanks.

A process where low micron solids, or a mixture of higher and lower micron solids can be removed thereby enhancing the quality of a recoverable hydrocarbon contaminant is described herein.

Figure 1:
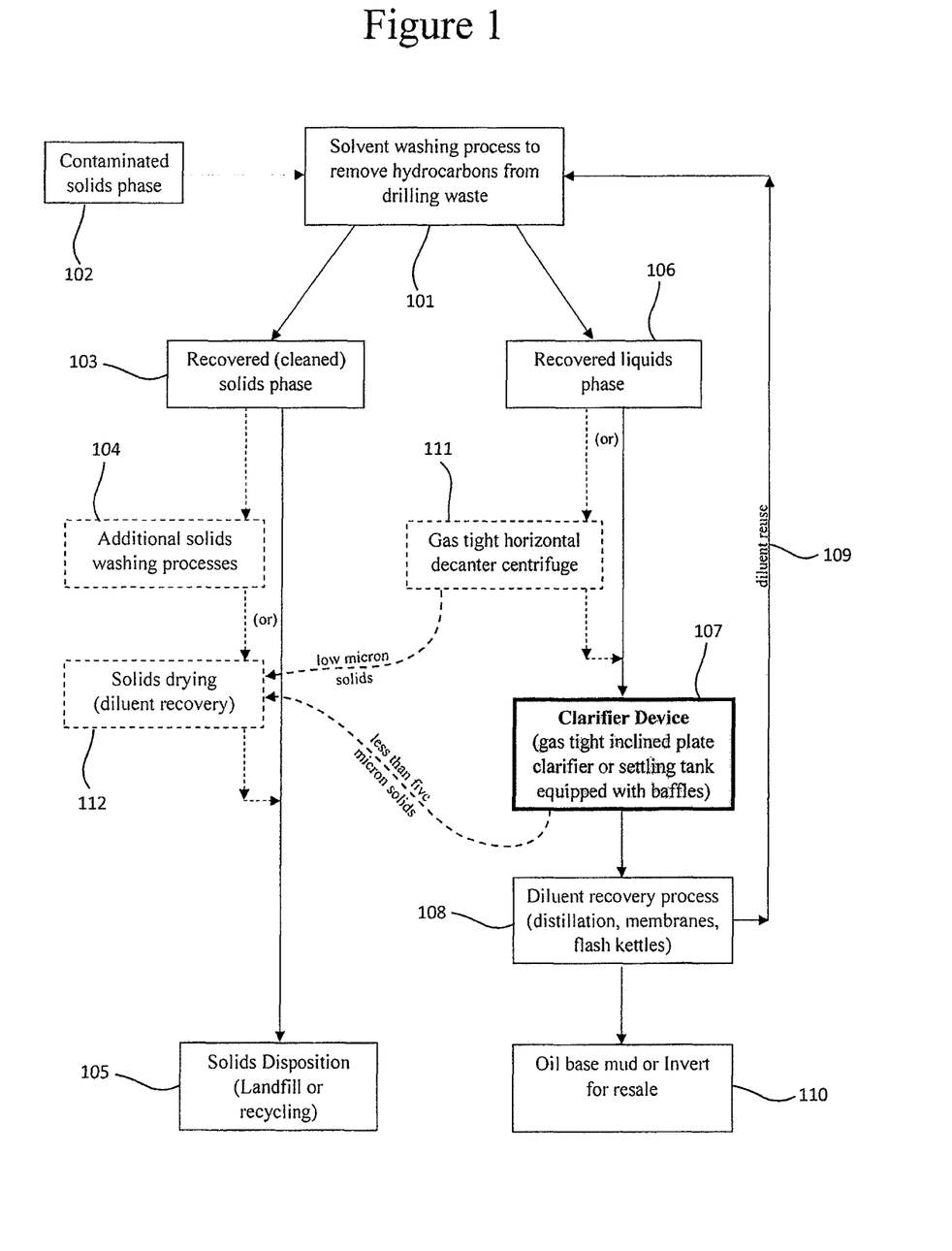
FIG. 1 is a flow chart which illustrates an embodiment of a process described herein.

FIG. 1 illustrates how the embodiment would be positioned to remove substantially all of the low micron solids, relative to a solvent-solids wash process (101). The unstabilized drill cuttings feed (102) is first conveyed from an atmospheric tank to a gas tight solvent wash process (101). The cleaned solids (103) are sent to additional wash processes (104) or dried (112) and ultimately recycled, or discarded to a final disposition (105). Low micron solids are removed from the recovered liquids phase (106) in a clarifier device (107) before the diluent is recovered in a solvent recover apparatus (108) and the diluent is reused (109) within the solids wash process (101). The recovered, high quality oil phase (110) is sent to storage for resale.

FIG. 1 also illustrates an alternate arrangement of the embodiment wherein a gas tight decanter centrifuge (111) is first employed to remove a substantial portion of the solids phase carried in the liquids phase, allowing a lessor volume of liquids phase to be sent to the clarifier device (107), or a lessor volume of solids to be sent to the clarifier device, either of which is desirable. In the latter embodiment, which is illustrated by dashed boxes or lines, the clarifier device is used to polish the previously centrifuged mixture of diluent and oil base drilling fluid and low micron solids to ensure the volume of residual low micron solids present in the mixture cannot adversely affect the quality of recovered oil from a diluent recovery process for example, a fractional distillation column, flash kettle system, or evaporator system, etc. (108).

Figure 2:
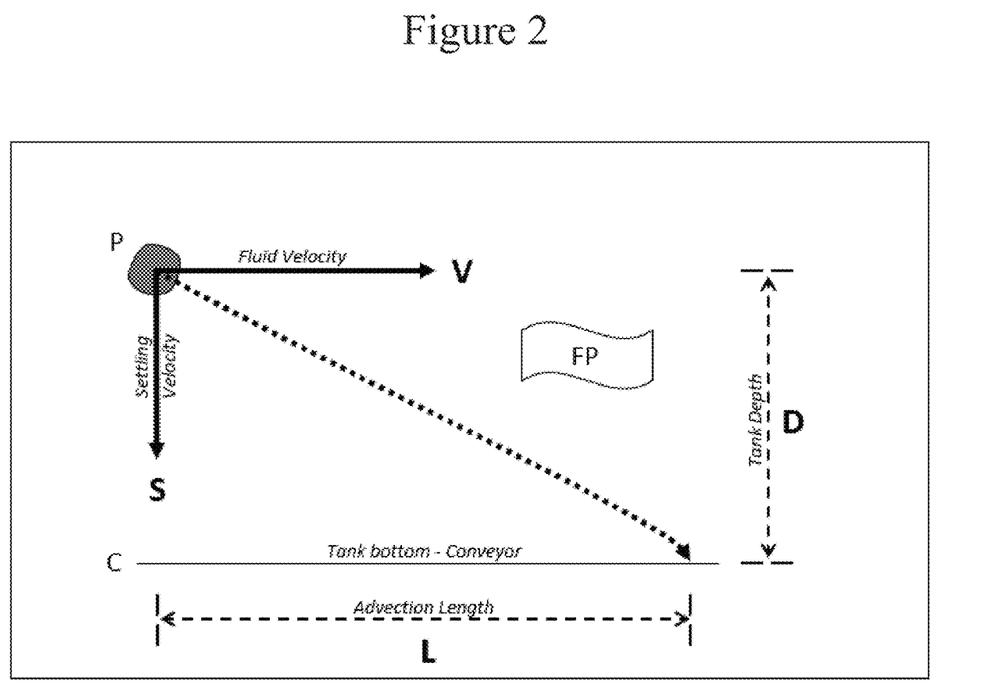
FIG. 2 illustrates an example of the physics involved with the precipitation of a solid particle in a non-quiescent environment.

The principals of solids phase advection are illustrated in FIG. 2 wherein V is the horizontal velocity of the mixture, S is the settling velocity of the solids phase, L is the minimum length of the clarifying tank to achieve precipitation of the solids phase, and D is the depth of liquid within the clarifying tank. Dependant on the fluid properties FP, a mixture of diluent and oil base drilling fluid and low micron solids will release the solids P with sufficient time to reach the bottom of the clarifying device wherein the solids (slurry) phase (which will still also contain some minor amounts of diluent and oil base drilling fluid) can be evacuated from the clarifying device by means of a conveyor C, only if V does not exceed S multiplied by (L/D). Conversely and more importantly, S must be equal to or greater V divided by (L/D). Therefore, the velocity at which a horizontal clarifying device may be operated to achieve the desired outcome disclosed herein is directly proportional to:
a) its length and inversely proportional to its depth; and,
b) for the purposes of the embodiment described within, the fluid properties are mixtures with a plastic viscosity of less than or equal to 5 cP and a yield point less than or equal to 1 Pa, both of which are relevant when designing the capacity (length and depth) of the clarifying device.

Horizontal or vertically arranged clarifying devices become self-flushing if they are inclined at an angle which exceeds the angle of repose of the settling solids. The angle of repose (shown in degrees, °) varies, depending on the solid itself; see for example, Table 3.

TABLE 3

| Soil Type | Dry | Moist | Wet |
| --- | --- | --- | --- |
| Top soil; loose | 35-40 | | 45 |
| Loam; loose | 40-45 | | 20-25 |
| Peat; loose | | 15-45 | |
| Clay/Silt; solid | | 40-50 | |
| Clay/Silt; firm | | 17-19 | |
| Clay/Silt; loose | | 20-25 | |
| Silt; | | 19 | |
| Sandy clay; | | 15 | |
| Sand; compact | | 35-40 | |
| Sand; loose | 30-35 | | 25 |

Horizontal or vertically arranged clarifying devices become self-flushing if the surfaces in contact with the settled low micron solids are inclined at an angle which exceeds the angle of repose of the settled settling solids. The minimum angle of repose for wet low micron solids is estimated to be in the range 20° to 50° (the greater the number being better). In such cases, flow enters the first end of the device where settling particles move to the lower end of the tank for evacuation and further processing, for example, a solids dryer. Clear effluent leaves the top of the device.

Notwithstanding the advection calculation offered above, the design of the plate pack, or arrangement of the weirs, or shape of the clarifying tank, or fluid volume of the clarifier device is of less importance to this embodiment described herein. Equal or greater consideration must be given to ensure the design facilitates:
a) Removal of low micron solids to a volume sufficiently low enough to ensure pyrolysis of the recovered oil phase cannot occur, herein defined as a solids volume of at least less than 1% (by weight) and ideally a solids volume of less than or equal to 0.1% (by weight); and, b) A process and apparatus for collecting and removing the recovered solids phase from the clarifier tank so that the recovered solids with a closed cup flash point less than 37° C. can be returned to an operatively connected process for residual solvent extraction, ensuring the solids phase is not discharged to the environment, or a final disposition (which can include a landfill or recycling method), with a closed cup flash point less than 60° C.; and, c) A process and apparatus for collecting and removing the liquids phase from the clarifier tank so that the recovered liquids can be returned to an operatively connected process for residual solvent extraction and subsequent reuse; and, d) Control the serious safety implications of separating VOC's in a clarifying tank. In order of some of the most serious to least serious issues to be controlled are:

i) the ability for transient oxygen to pollute an otherwise inert atmosphere; this is of particular concern to operators or processes because both the diluent and oil base drilling fluid described herein will be flammable. If one were to imagine a process where the clarifying tank is connected to a process, thereby sharing a common atmosphere that must remain inert, it would be completely unacceptable for the connected clarifying tank to introduce oxygen because the outcome could be catastrophic for the process, or worse yet, catastrophic for operators in the area of the process;

ii) the ability for volatile vapors to escape an otherwise inert atmosphere. As mentioned above, volatiles are typically handled in a fashion that prevents the possibility of evaporation or ignition. Despite numerous safety protocols having been established in work places over time, the possibility of an accidental (i.e. static electricity, mechanical failure, operator error, etc.) ignition source being the cause of a fire, remains a concern. This would clearly apply to a process where a volatile, flammable mixture is being clarified using an atmospheric clarifier tank. Clearly, some of the volatiles would become airborne around the process and they would linger within the work area. Given that both fuel and oxygen would be present in an atmospheric condition, the possibility of an accidental ignition source resulting in even a small, isolated flash fire could result in serious harm or death to the operator, or cause additional upstream or downstream process collapse, resulting in even greater loss. Hexane, for example, is a volatile that would fall within the vapour pressure and flashpoint limitations as described herein. Hexane is flammable in concentrations of as little as 1.1% (by volume) and as much as 7.5% (by volume);

iii) a further concern is the VOC and its effects on the environment. Like many VOC's, hexane is a neurotoxin and can have severe effects on organisms in even low concentrations. For that reason, operator exposure limits in the regulatory jurisdiction of Alberta, for example, is only 50 ppm (parts per million);

iv) loss of the product diluent by evaporation. Disclosed herein are a range of diluents which are or contain hydrocarbons. Typically the cost of a litre or gallon of a hydrocarbon based diluent is at a minimum, comparable to the cost of an equal amount of gasoline or diesel. In short, the cost of the diluent is significant and every effort must be made to recover the diluent, if not for the reasons outlined in items i, ii, and iii above, then most certainly to maximize economics.

While the selection of a diluent is very important, it is of less importance other than to say, the process and apparatus must be capable of safely managing the properties of the diluent from both a process and safety standpoint. Typical diluents useful in recovering hydrocarbons from solids include those diluents with a vapour pressure equal to or greater than 0.1 Torr and less than 760 Torr (corrected to 20° C.), and further, the diluent having a flash point equal to or less than 37° C. Such diluents are commonly referred to as volatile organic compounds, or VOC's.

Figures 3A, 3B, 3C:
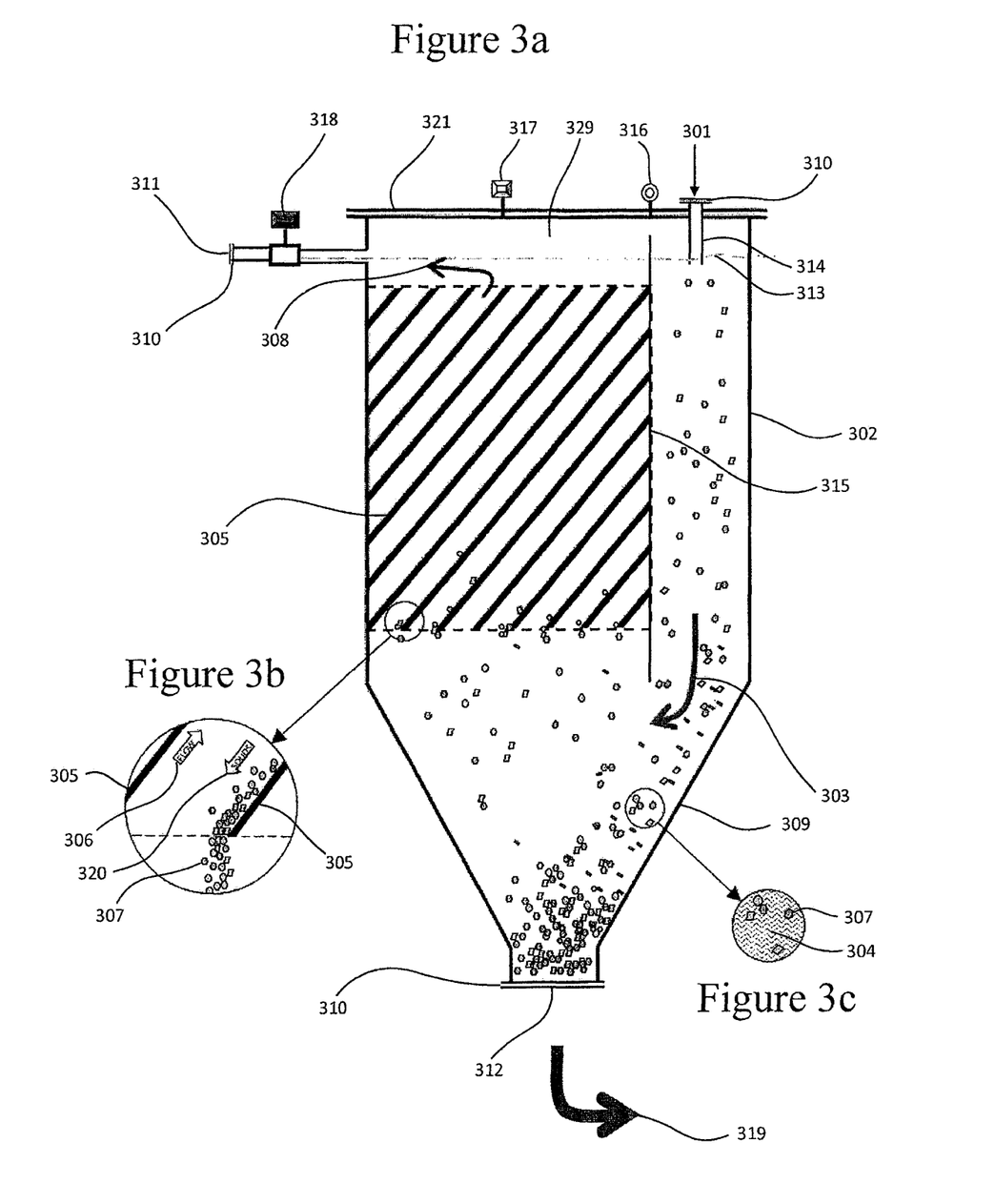

FIGS. 3a, 3b & 3c illustrate a first example of the settling/clarifying device highlighted in FIG. 1 (107). Specifically, a gas tight inclined plate clarifying device allows the polluted mixture to enter the gas tight/flanged (310) inlet (301) of the clarifier tank that consists of a conduit (314) which is either horizontal or vertical or at an angle, and extends below the liquid level (313) where the mixture is directed between a tank wall (302) and inner dividing wall (315) before the mixture enters a calm settling (semi-quiescent) environment (303). The mixture generally would not consist of a ratio of more than 10:1 diluent to oil base drilling fluid and low micron solids, and generally would not consist of less than a 1:1 ratio of diluent to oil base drilling fluid and low micron solids with the ideal mixture consisting of a 5:1 ratio of diluent to oil base drilling fluid and low micron solids. The semi-quiescent environment is effectively a gentle laminar flow regime with low velocities, reducing the possibility of low micron solids (307) being churned and re-suspended in the bulk fluid.

The liquids phase (304) follows a flow pattern (306) upward through the plates (305), which are installed on an angle that exceed the angle of repose of the settling low micron solids. The low micron solids phase (307) immediately begins to settle from the liquids phase (304) and it comes to rest on the plates (305), where it can slide down (320) along the top side of the sloped plates (305) back into the hopper shaped bottom of the tank. The sloped walls of the tank (309) are also designed to exceed the angle of repose of the settling low micron solids (307). The low micron solids phase, now containing less liquids due to compression of solids which squeeze the liquids phase upward, are evacuated through the gas tight/flanged (310) outlet (312) by means of a conveyor (319) (not specifically illustrated). The less turbid liquids phase (308) continues upward along the bottom side of the plates (305) until it reaches the top of the plate pack and flows to the outlet (311), where it overflows from the gas tight/flanged (310) outlet (311) of the clarifier tank. Optionally, a level transducer (316) and oxygen deficiency monitor (317) can be installed along the top lid section (321) which is sealed against the clarifier device to ensure no exchange of gasses can occur during the process of separation. Further a turbidity monitor (318) can be installed in line of the outlet (311) to provide continuous or semi-continuous readings of the process metrics. Typically, the inclined plate clarifiers are arranged to be more vertical than horizontal in shape.

Figure 4A:
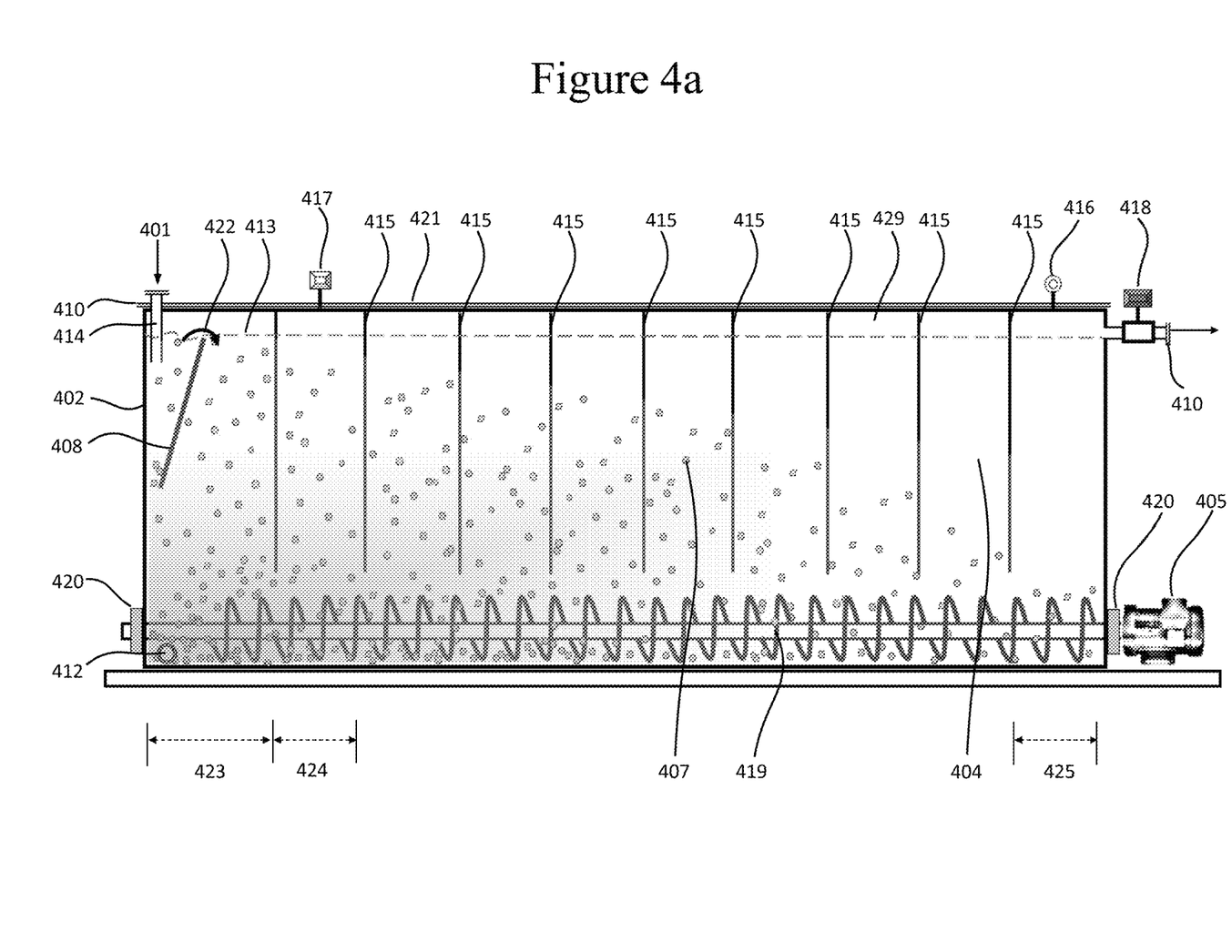
FIG. 4a is an illustration of a gas tight live bottom settling tank useful in an embodiment described herein.

FIGS. 4a, b & c illustrate a second example of the settling device highlighted in FIG. 1 (107). This design of a gas tight clarifier tank also uses a semi-quiescent single gravitational force to separate mixtures of diluent and oil base drilling fluid and low micron solids. The mixture generally would not consist of more than 10:1 (diluent to oil base drilling fluid and low micron solids), and generally would not consist of less than 1:1 (diluent to oil base drilling fluid and low micron solids) with the ideal mixture consisting of 5:1 (diluent to oil base drilling fluid and low micron solids). The mixture is conveyed into the gas tight/flanged (410) inlet (401) conduit (414) which is either horizontal or vertical or at an angle, and extends below the liquid level (413) where the mixture is briefly held between the end wall (402) of the tank and a calming weir (408) to cause the mixture to become less excited. The less excited mixture uniformly spills over (422) the calming weir (408) to prevent the first channel of the clarifier tank from becoming unduly agitated. Compartments (423, 424, 425, etc.) within the clarifier tank are created where baffles (415) are installed perpendicular to the length of the rectangular tank walls. Greater than one baffle is installed and each offset to one side, alternating to the other for the next baffle. Each baffle (415) is narrower than the width of the end of the tank (402). This creates a zig zag route (403) for the liquids phase, thereby creating a longer retention time within the clarifier tank. The flow pattern is like that of a river zig zagging (winding) through a valley.

Figure 4B:
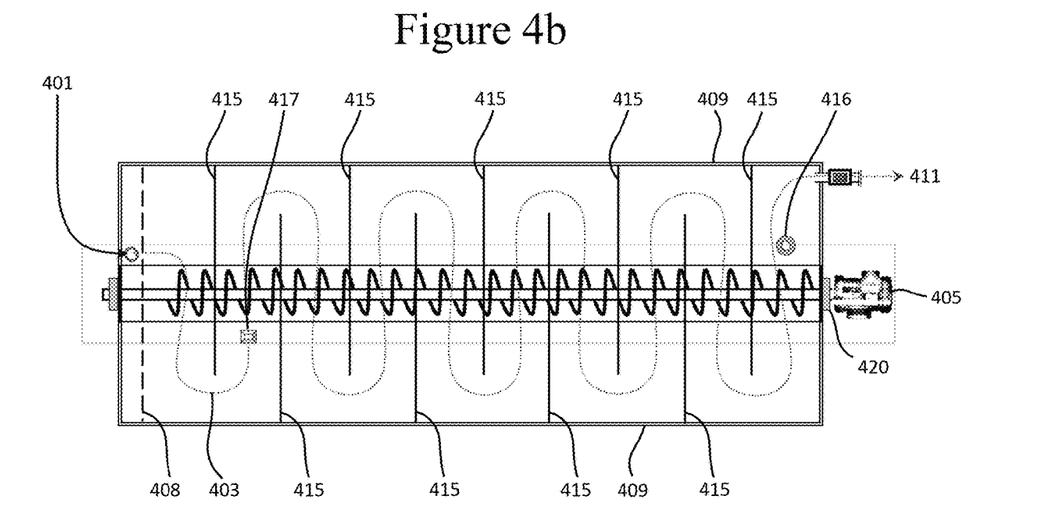
Figure 4C:
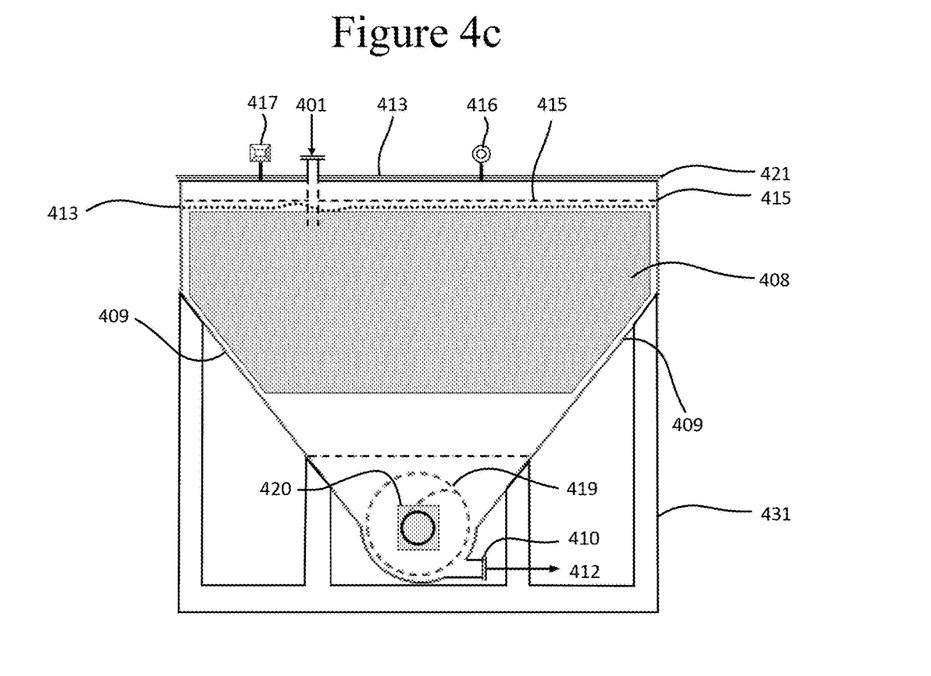

A separation of the liquids phase and solids phase begins in the first compartment (423), moving in constant single converse direction into the second compartment (424) and so on through additional compartments as required. As the mixture flows through the lazy zig-zag pattern (403) to reach the end compartment (425) of the clarifier tank, the low micron solids (407) settle from the liquids phase (404) either directly downward to the bottom of the tank (406) or along either tank wall (409) which is designed to exceed the angle of repose of the settling low micron solids (407). A conveyor (419) operates very slowly, scalping the solids phase and slowly conveying it to a common point (412) nearer the front end of the clarifier tank, counter current to the zig zag flow pattern. The slow speed conveyor is moving at a speed which reduces the possibility of low micron solids becoming unduly agitated and re-suspended into the mixture of diluent and oil base drilling fluid. For example, an auger which is approximately 300 millimeters in diameter would be rotating approximately one revolution per minute or less. The slow speed is not absolute in preventing re-agitation, but low micron solids which are re-suspended will be carried at least a short distance by the gentle laminar flow regime and have an opportunity to re-settle back to the tank floor (406) and re-conveyed to the common evacuation point (412). The conveyor is ideally driven by an electric or hydraulic or pneumatic motor (405), which is slowed through a gear reduction transmission and further controlled by conventional variable frequency drive (not shown) or hydraulic valve (not shown) or air regulator (not shown). Mechanical seals (420) prevent the volatile diluent and oil base drilling fluid from leaking through the opening which the shaft of an auger for example, protrudes from the inside of the tank to connect to the motor on the outside of the tank.

The low micron solids phase (now containing less liquids phase (404)) are evacuated through the gas tight/flanged (410) outlet (412) by means of a close coupled conveyor (not shown) to another gas tight process, like that of a diluent recovery process (108) for example. The non-turbid liquids, now substantially (if not completely) free of low micron solids overflows the gas tight/flanged (410) outlet (411) of the back end of the clarifier tank where it can be pumped to additional supporting gas tight processes (104, 108 and/or 112), further described below.

The semi-quiescent environment is effectively a gentle laminar flow regime with low velocities, reducing the possibility of low micron solids being churned and re-suspended in the bulk fluid. The solids phase (407) is permitted to settle from the liquids phase (404) to the tank floor as the liquids phase moves a length greater than the length of the tank walls (409), in a direction parallel to the baffles (415).

Typically, clarifier tanks are arranged to be more horizontal than vertical in shape. This means that clarifier tanks have a larger internal volume and larger foot print, which makes flanging the normally open top of a tank more difficult. Ideally, the tank would be sealed along the top using a solid metal lid (421) which is welded/fused to the tank to ensure no atmospheric exchange can occur. Metal components have the added benefit of additional strength, over that of fiberglass or plastic, for example.

Either clarifying device design is useful for the process and apparatus described herein but must be constructed such that flanges and gaskets (310 or 410) or a full metal weld penetration can facilitate a gas tight barrier along:
a) the otherwise open top of the traditional inclined plate clarifier design or settling tank design,
b) the inlet (301 or 401) where the mixture enters the clarifier device; and,
c) the outlet (311 or 411) where the non-turbid diluent and oil base mud exit the clarifier device; and,
d) the solids outlet (312 or 412) where the solids slurry is evacuated (319) from the tank.

Provided the flanges and gaskets (or in the case of metal pieces that are not required to be disassembled, a full metal weld/fusing) are used to seal the device, the clarifying tank could be employed to safely remove low micron solids from an otherwise volatile diluent and oil mixture. Given the closed gas tight design of the inclined plate clarifier, an oxygen deficiency monitor (316 or 416) can be installed along the top inner atmosphere (329 or 429) of the tank, and a level monitor (317 or 417) installed to monitor the liquid level (313 or 413) in the tank, and optionally, a turbidity monitor (318 or 418) installed at the outlet (311 or 411) to ensure the low micron solids phase is substantially, if not completely removed from the liquids phase (304 or 404).

Despite the complexity of building a gas tight clarifying device which is capable of withstanding a slight positive process pressure, and resilient to the migration of oxygen or volatile vapours, the engineering and design considerations are substantially less than that which is required to design a gas tight horizontal decanter centrifuge or gas tight stacked disc centrifuge, the latter of which is capable of extremely high gravitational forces, for example, up to 12,000 gravity forces, which is capable of removing low micron solids from the mixture described within, post processing in a horizontal decanter centrifuge.

Either concept for a clarifying tank or others is satisfactory, provided the low micron solids are removed to the satisfaction of the operator, so that the mixture will not cause adverse effects on supporting processes, or the recovered fluids from the supporting processes are of a satisfactory quality for further refining or reuse, all essential to the recovery and resale of a quality oil base drilling fluid.

Delivery of the mixture of diluent, oil based drilling fluid and low gravity solids is also important to the proper operation of the clarifier device. In all cases, the fluids (containing solids) delivery system is ideally consistent in flow, air tight, sealed and blanketed as well so as to result in a safe, inert environment that is substantially free of any oxygen. A blending tank can be used to maintain uniformity of a mixture until the mixture is conveyed to the gas-tight clarification device at a consistent flow rate to achieve the desired separation, while managing process surges and prohibiting a breach of the gas tight process.

A conveyor (319/419) used to evacuate the low micron solids containing a diluent from the clarifier device, without limitation, may be selected from any one or more of an auger, drag chain, rotary valve, progressive cavity pump, rotary lobe pump, centrifugal pump or vacuum conduit.

The processes and apparatus described herein can be employed post recovery of an oil based drilling fluid containing low gravity solids such as, from a conventional solids control process on a drilling rig, including but not limited to, a centripetal cuttings separator, an atmospheric decanter centrifuge, a shale shaker, or hydrocyclone, in unison with a solvent (diluent) washing apparatus, like that of the co-owned art disclosed within. If and when applicable, additional diluent can be added to the slurry of liquids and low micron solids in for example, a gas tight blending tank or manifold, or combination of commercially available blending methods to create a uniformity of the mixture properties identified above, provided the method of introducing the otherwise volatile diluent doesn't also introduce air containing oxygen or permit the release of vapour from the process.

It should also be recognized that the liquids phase and solids phase recovered from the clarifying process described within is sent to additional supporting gas tight processes which can include one or more of, a solids drying process for residual liquids recovery, wash processes for additional contaminant removal, or diluent evaporation and recovery processes such as flash kettles, distillation towers, or evaporators for diluent reuse and/or contaminant recovery.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of removing low micron solids from recovered oil based drilling fluid comprising:
    mixing the drilling fluid containing low micron solids with a diluent;
    separating the mixture, in a gas tight clarification device, into a liquids phase and a low micron
    solids phase in a laminar flow regime; and
    calming the separated liquids phase and the low micron solids phase in the gas tight clarification device to produce a recovered liquids phase and a separated low micron solids slurry, wherein the clarification device is sealed so as to prevent escape of vapors from the mixture into the atmosphere containing oxygen and the introduction of atmospheric oxygen into the mixture or the environment of the mixture being clarified, the clarification device includes a gas tight inlet for the mixture, the clarification device includes a first gas tight outlet for the recovered liquids phase, and the clarification device includes a second gas tight outlet for the separated low micron solids slurry.

2. The method of claim 1, wherein the clarification device includes a conveyor in fluid flow communication with the second gas tight outlet to collect the low micron solids slurry.

3. The method of claim 1, wherein the clarification device includes a bottom inclined at an angle.

4. The method of claim 3 wherein the angle exceeds the angle of repose of the settled low micron solids.

5. The method of claim 1, wherein the gas tight clarification device is sealed so as to provide an internal working pressure up to about 750 Torr gauge.

6. The method of claim 1, wherein the method of removing is performed in an inert atmosphere.

7. The method of claim 6 wherein the inert atmosphere comprises carbon dioxide, nitrogen, natural gas, and/or mixtures thereof, and less than 9% oxygen.

8. The method of claim 1, wherein the diluent has a vapour pressure between about 0.1 Torr gauge and about 750 Torr gauge measured at 20° C.

9. The method of claim 1, wherein the diluent has a closed cup flash point less than or equal to 37° C.

10. The method of claim 1 wherein the slurry of low micron solids removed from the clarification device has a flash point of less than 37° C.

11. The method of claim 1, wherein the liquids phase of the mixture has a plastic viscosity of less than or equal to 5 cP.

12. The method of claim 1, wherein the liquids phase of the mixture has a yield point less than or equal to 1 Pa.

13. The method of claim 1, wherein the diluent is hexane.

14. The method of claim 1, wherein the mixture has a vapour pressure equal to or greater than 0.1 Torr gauge and less than 750 Torr gauge when measured at 20° C. and the mixture has a closed cup flash point equal to or less than 37° C.

15. The method of claim 1, wherein the diluent and the recovered oil based drilling fluid are blended prior to introduction into the gas tight clarification device.

16. The method of claim 15, wherein the diluent and the recovered oil based drilling fluid are blended in a gas tight blending tank prior to being introduced into the gas tight clarification device.

17. The method of claim 1, wherein the oil based drilling fluid containing low micron solids is recovered by a solids control process, and diluent is added prior to low micron solids removal in the gas-tight clarification device.

18. The method of claim 17, wherein the solids control process includes a centripetal cuttings drier, an atmospheric oilfield decanter centrifuge, a shale shaker, and/or a hydrocyclone.

19. The method of claim 1, wherein the oil based drilling fluid, low micron solids and diluent are first introduced into a gas tight decanter centrifuge at a controlled rate and the gas tight decanter centrifuge is operated at a percentage of less than the rated hydraulic loading capacity so as to produce less than 1% by weight low micron solids in the recovered liquids phase, prior to the recovered liquids phase of the gas tight decanter centrifuge being introduced to the clarification device.

20. The method of claim 1, wherein the recovered liquid phase from the clarification device contains low micron solids in a quantity less than 1% by weight.

21. The method of claim 1, wherein the recovered liquid phase from the clarification device contains low micron solids in a quantity less than 0.1% by weight.

22. The method of claim 1 wherein the slurry of low micron solids is removed using a conveyor.

23. The method of claim 1 wherein the diluent and oil based drilling fluid introduced to the clarifying tank contains low micron solids that are less than 5 microns in average size.

24. The method of claim 1 wherein the diluent and oil based drilling fluid introduced to the clarifying tank contains low micron solids that are greater than 5 microns in average size.

25. The method of claim 1, wherein the liquids phase recovered from the clarifying process is sent to one or more additional gas tight processes including solids drying, wash processing, diluent evaporation, and/or filtration.

* * * * *